United States Patent [19]
Okada et al.

[11] Patent Number: 5,806,172
[45] Date of Patent: Sep. 15, 1998

[54] METHOD FOR MANUFACTURING A MAGNETIC HEAD

[75] Inventors: Masaru Okada; Yuichiro Murata; Hirofumi Ouchi, all of Amagasaki, Japan

[73] Assignee: Mitsubishi Denki Kabushiki Kaisha, Tokyo, Japan

[21] Appl. No.: 921,592

[22] Filed: Sep. 2, 1997

Related U.S. Application Data

[63] Continuation of Ser. No. 530,235, Nov. 7, 1995.

[30] Foreign Application Priority Data

Feb. 8, 1994 [JP] Japan ..................... 6-014389

[51] Int. Cl.⁶ ................... G11B 5/127; G11B 5/235
[52] U.S. Cl. ..................... 29/603.21; 29/603.11; 360/127
[58] Field of Search ................ 29/603.11, 603.2, 29/603.21; 148/308, 310; 360/122, 127; 428/692, 900

[56] References Cited

U.S. PATENT DOCUMENTS

| | | | |
|---|---|---|---|
| 4,279,633 | 7/1981 | Nakamura | 29/603.21 X |
| 4,837,922 | 6/1989 | Torin et al. | 29/603.21 |
| 4,928,382 | 5/1990 | Fujiwara et al. | 29/603.21 X |
| 5,162,960 | 11/1992 | Sakata et al. | 29/603.11 X |
| 5,170,301 | 12/1992 | Muraoka et al. | 29/603.21 X |
| 5,382,305 | 1/1995 | Terunuma et al. | 428/692 X |

FOREIGN PATENT DOCUMENTS

| | | |
|---|---|---|
| 3-222309 | 9/1988 | Japan . |
| 5-109019 | 4/1993 | Japan . |

OTHER PUBLICATIONS

N. Miyamoto et al., "Relationship of Exciting Current to Noise–After–Write of Thin Film Head", *Nihon Ouyo Jiki Gakkai*, vol. 16, No. 2, 1992, pp. 91–94.

*Primary Examiner*—Peter Vo
*Attorney, Agent, or Firm*—Burns, Doane, Swecker & Mathis, LLP

[57] ABSTRACT

In relation to the magnetic head using a polycrystalline Mn-Zn ferrite as a core material, a magnetic head manufacturing method is provided for preventing the generation of the post-recording noise which is a pulse noise generated immediately after the completion of a current flow through the recording and reproducing coil. A fused core block is manufactured using Mn-Zn ferrite having a mean crystal grain size of equal to or less than 30 μm as the core material of at least the recording and reproducing head and glass fusion using one type of glass, and the fused core block is annealed at a temperature equal to or higher than the strain point of the glass.

15 Claims, 10 Drawing Sheets

FIG. 5
(PRIOR ART)
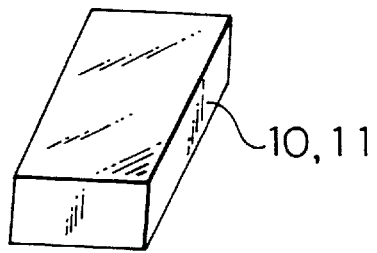
FIG. 6(A)
(PRIOR ART)
FIG. 6(B)
(PRIOR ART)
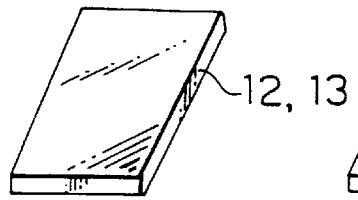 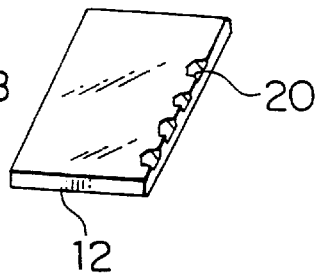
FIG. 7(A)
(PRIOR ART)
FIG. 7(B)
(PRIOR ART)
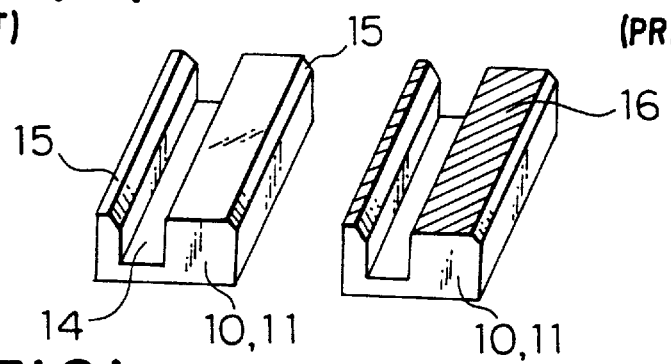
FIG. 7(C)
(PRIOR ART)
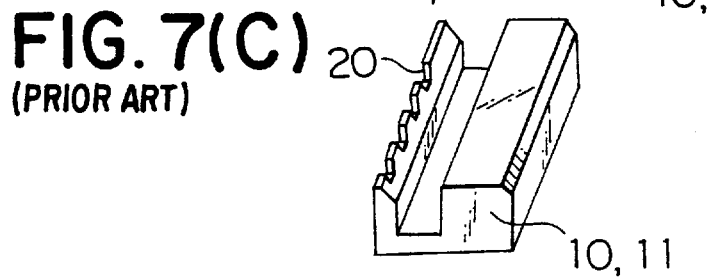

FIG. 8(A) (PRIOR ART)
FIG. 8(B) (PRIOR ART)
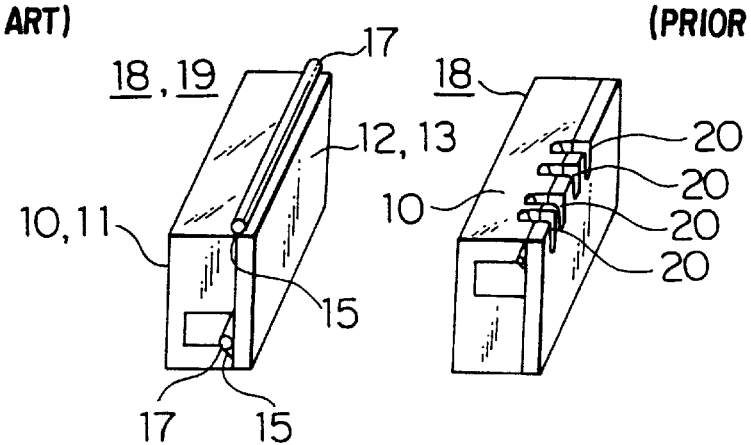
FIG. 9(A) (PRIOR ART)
FIG. 9(B) (PRIOR ART)
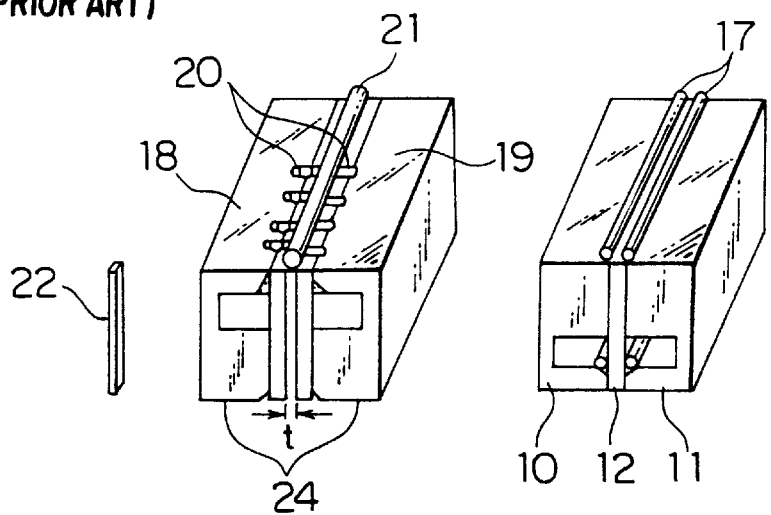
FIG. 10 (PRIOR ART)
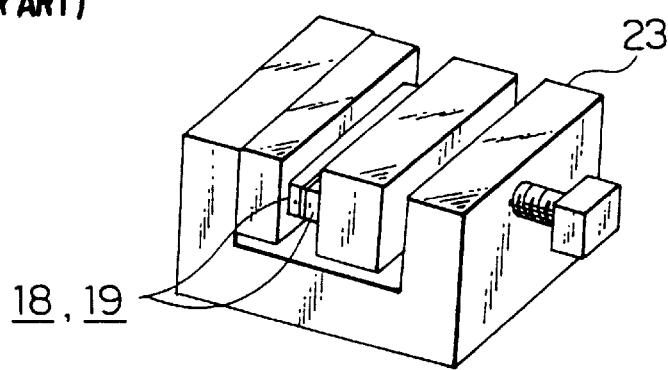

(a) POSITIVE POLARITY (b) NEGATIVE POLARITY (A) HEAD WITH NO POST-RECORDING NOISE (B) HEAD WITH LARGE POST-RECORDING NOISE

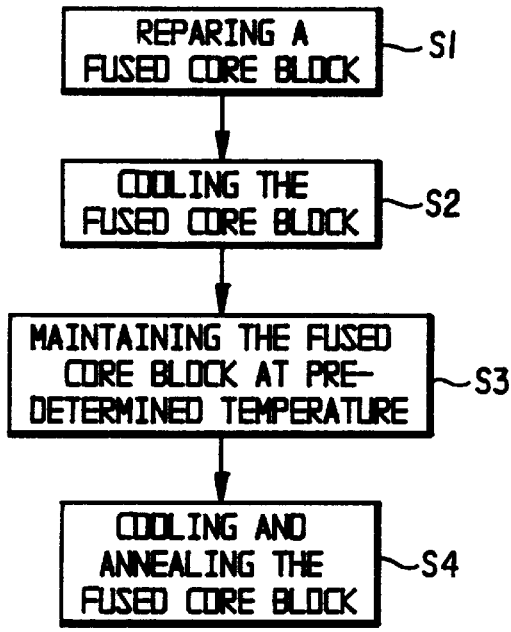
FIG. 21(A)
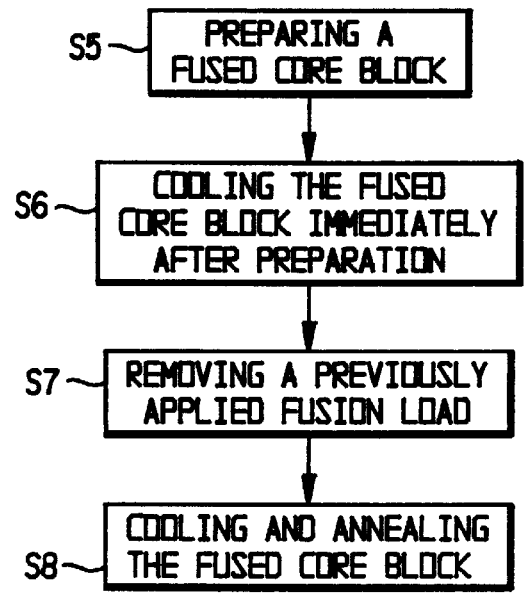
FIG. 21(B)
FIG. 21(C)
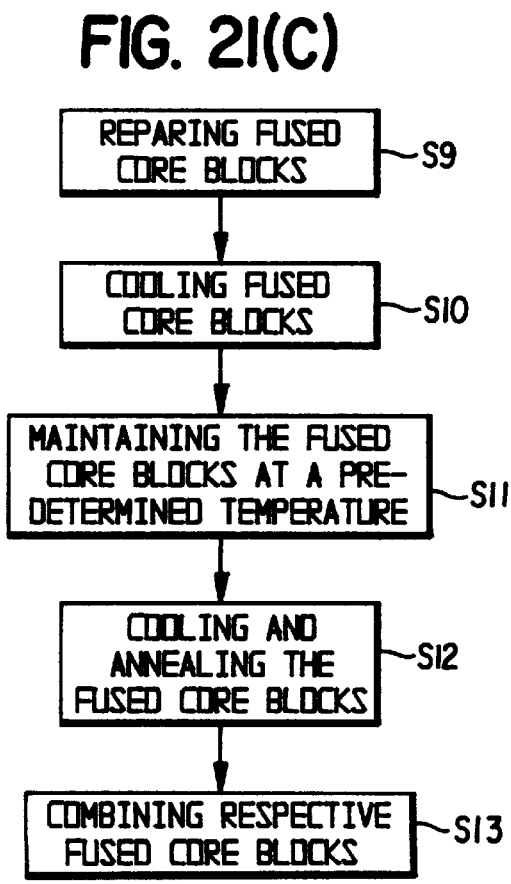
FIG. 21(D)
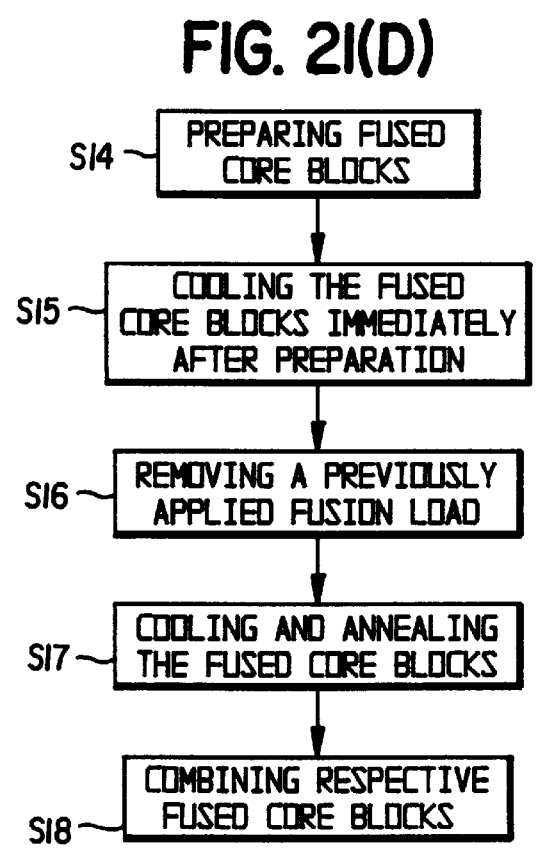

METHOD FOR MANUFACTURING A MAGNETIC HEAD

This application is a continuation of application Ser. No. 08/530,235, filed Nov. 7, 1995 now abandoned.

TECHNICAL FIELD

This invention relates to a method for manufacturing a magnetic head for preventing the pulse noise generation which occurs immediately after the completion of the flow of the current through the recording and reproducing coil in a magnetic head for recording and reproducing the information onto the magnetic recording medium or in a composite magnetic head for recording and reproducing and erasing and used in a flexible disc drive apparatus (FDD) which is an external memory device of an electronic computer, for example.

BACKGROUND ART

As a typical magnetic head used in a 3.5 in. FDD, a device shown in FIGS. 1 to 4 is known.

FIG. 1 illustrates one of the typical examples of the composite magnetic head for use in a 3.5 in. FDD having an unformatted memory capacity of 2 MB (megabyte) which is referred to as a tunnel erase type head having the erasing head positioned at the rear side of the recording and reproducing head with respect to the advancement of the magnetic disc, and FIGS. 2 to 4 illustrate a typical example of a composite magnetic head for use in a 3.5 in. FDD having an unformatted memory capacity of 4 MB (megabyte) which is referred to as an advance erase type head in which the erase head is positioned front side of the recording and reproducing head with respect to the incoming magnetic disc.

The magnetic head shown in FIGS. 1 to 4 comprises a recording and reproducing (R/W) core 1, an erase (E) core 2, a center (I) core joined to both of the R/W core 1 and the E core 2 and defining an R/W gap 7 and an E gap 8, a back bar 4 magnetically connecting the I core 3 to the R/W core 1 and the E core 2, and a fusion glass 5 filling track width defining grooves of the R/W core 1 and the E core 2 and defining an R/W gap 7 and an E gap 8. The R/W core 1 and the I core 3 constitute a recording and reproducing head 9 and the E core 2 and the I core 3 constitute an eraser head 10. In the figures, an R/W coil and an E coil, which are wound on the R/W core 1 and the E core 2, respectively, are omitted. It is to be noted that the composite magnetic head shown in FIG. 2 is of the I core separated type in which a mold glass 6 different from the glass 5 for defining the gap is disposed in the intermediate portion and the track width defining grooves of the I core 3. Also, while FIGS. 1 and 4 illustrate the I core separated type composite magnetic head employing one kind of glass, a mold glass may be used in the I core separation portion.

The method for manufacturing the magnetic head illustrated in FIGS. 1 and 4 will now be described in conjunction with FIGS. 5 to 9.

As shown in FIGS. 5 and 6(A), as a core material, ferrite pieces 10 and 11 for the R/W core and the E core as well as ferrite pieces 12 and 13 for the I core are prepared and the surfaces of the respective core materials which define the gaps are lapping finished to provide a mirror surface. For each core material, a high-density polycrystaline Mn-Zn ferrite usually referred to as HIP material which has a small number of cavity holes is used.

Then, as shown in FIG. 7(A), a winding groove 14 with a taper 15 is formed in the mirror surface of the ferrite pieces 10 and 11 for the R/W core and the E core. Then, as shown in FIG. 7(B), a gap material 16 of $SiO_2$, $Al_2O_3$ or the like is formed in a thin film by a method such as the spattering and evaporation deposition. The film thickness is of the order of 1.0 m for the R/W core for 2 MB, about 0.5 $\mu$m for the R/W core for 4 MB and about 2.0 $\mu$m for the E core. The gap material 16 may be formed on the ferrite pieces 12 and 13 for the I core, or it may be formed on both of the ferrite pieces 10 and 11 for the R/W core and the E core and the ferrite pieces 12 and 13 for the I core.

Then, as shown in FIG. 8(A), the gap-defining surfaces of the ferrite pieces 10 and 11 for the R/W core and the E core and the gap-defining surfaces of the ferrite pieces 12 and 13 for the I core are brought into abutment with each other and then they are glass-fused by a glass rod 17 to form a unitary structure of the respective core materials, whereby a fused core block 18 for the R/W head and a fused core block 19 for the E head are formed.

In the 4 MB advance erase type FDD head, since the distance between the R/W gap and the E gap is 200 $\mu$m, the thickness of the I core is small. Therefore, the thickness of the I core ferrite pieces 12 and 13 are made thick enough to provide a mechanical strength endurable to the machining until this process, and after the formation of the track width defining grooves 20 as shown in FIG. 8(B) after the glass fusion, they are finished into the predetermined thickness by the lapping finish.

Further, in order to manufacture an MIG (metal-in-gap) superior in the recording performance, a high saturation magnetic flux density material, such as amorphus alloys of Co-Zr-Nb system and Sendust alloy, may be formed as a thin film on the R/W gap surfaces before the R/W gap material 16 is formed.

Also, in the glass fusion process, a fusion jig 23 made of alumina which has a superior heat resistivity is usually employed, whereby a compression stress due to the difference in the thermal expansion coefficient between the R/W head fusion core block and the E head fusion core block 18 and 19 and the fusion jig 23 acts on the fusion core blocks 18 and 19, thereby allowing the formation of a uniform gap length.

Thereafter, the fusion core blocks 18 and 19 are joined into a unitary structure by means of glass (hereinafter referred to as mold glass) in the gap between them. The glass used at this time may be glass having a melting point lower or equal to that of the glass used in the glass fusion of the fusion core blocks 18 and 19.

In a method using the glass of a lower melting point, as shown in FIG. 9(A), the R/W head fusing fusion core block 18 and the E head fusion core block 19 are positioned with a predetermined space width therebetween, and the mold glass rod 21 is molten to fill the mold glass in the space width t and the track width defining grooves 20. At this time, in order to prevent the gap defined between the fusion core blocks 18 and 19 is opened, a glass having a melting point lower than the strain point of the glass 17 used in the glass fusion used in the fusion core blocks 18 and 19 may preferably be used.

In a method using the same glass, as shown in FIG. 9(A), the R/W head fusion core block 18 and the E head fusion core block 19 are positioned with a plurality of spacers 22 made of ceramics of calcium titanate or barium titanate or a high-melting point glass interposed therebetween, and the glass rod 17 instead of the mold glass rod 21 is fused to fill the fused glass under the conditions that the side surfaces of the R/W fusion core block 18 and the E core fusion core block 19 are subjected to a load by means of the fusion jig 23 shown in FIG. 10.

After the R/W head fusion core block 18 and the E head fusion core block 19 are made unitary, the lower portion of the unitary core block 24 is cut off, and the unitary core block 24 is cut along its longitudinal direction by means of a diamond wheel and then sliced in the direction perpendicular to the longitudinal direction of the unitary core block 24 by means of a wire saw cutter or the like to form head chips. After coils are wound around the leg portions of the R/W core and the E core, a back bar made of a magnetic material is attached to the cores to magnetically shunt the legs of the R/W core and the I core as well as the E core and the I core, whereby the composite magnetic head as shown in FIGS. 1 and 4 can be obtained.

The manufacturing method of the composite magnetic head illustrated in FIG. 2 will now be described. In this manufacturing method, the distinguishing feature resides in that the track width defining grooves 20 is formed in the I core ferrite piece 12 as shown in FIG. 6(B) and the track width defining grooves 20 are separately formed in the R/W core and the E core ferrite pieces 10 and 11, and other process is basically the same as that of the composite magnetic head manufacturing method shown in FIGS. 1 and 4.

Also, in the manufacturing method of the composite magnetic head illustrated in FIG. 3, as similarly to the manufacturing method of the composite magnetic head shown in FIG. 2, the track width defining grooves 20 are separately formed in each ferrite piece and the glass fusion is carried out as shown in FIG. 9(B) by positioning the R/W core and the E core ferrite pieces 10 and 11 on both sides of the I core ferrite piece 12 and by fusing the glass 17 and by using the fusion jig 59 to make a unitary structure.

In the above described conventional composite magnetic head, a pulse noise (hereinafter referred to as post-recording noise) is generated immediately after the flow of a recording current to the record/reproduction coil has been completed. The post-recording noise ceases to generate after a while (after 200 ms). FIG. 11 illustrates an example of a measurement of the single waveform of the post-recording noise, most of this waveform is of single polarity. As for the post-recording noise, it is known from The Relationship between the Excitation Current and the Probability of the Post-Recording Noise Generation (page 91–94, vol. 16 (1992) Journal of the Japanese Applied Magnetic Society), for example, that the post-recording noise is observed in a thin-film magnetic head using a metallic magnetic thin-film such as Permalloy which is mainly used as the magnetic head for the hard disc as a core material. While it is pointed out that the waveform in this case is of two polarity, the post-recording noise to which the present invention pertains is of single polarity as discussed above, the polarity of which depends upon the last polarity of the recording current. This means that this is a uni-directional magnetization change from a magnetization point determined by the external magnetic field by the recording current on the hysterisis cycle line of the core toward the residual magnetization point.

FIG. 13 illustrates a measurement example of the reproduced waveform in which the post-recording noises are overlapped. While the post-recording noise generates within a short time interval after the recording, in the digital magnetic recording system for use in the computer auxiliary recording device such as FDD, the hard disc unit or the like, as shown in FIG. 13, the post-recording noise causes the waveform to be deformed and becomes a cause for the data error in the reproduction, so that the prevention of the post-recording noise is indispensable.

Japanese Patent Laid-Open No. 63-222309 discloses that the VTR head can be improved in the reproduction output and in the reduction in flactuation of the variation of the characteristics by annealing at a temperature range of from the glass transition point temperature to the flow temperature, but this fails to disclose about the above-discussed post-recording noise. As for the post-recording noise, Japanese Patent Laid-Open No. 5-109019 may be the only reference, which suggests that making the crystalline grain size of ferrite small and the annealing of the magnetic head chip can be effective counter measures for the prevention of the post-recording noise.

The present invention relates to a magnetic head which uses a polycrystaline Mn-Zn ferrite as a core material, studying in detail the cause of the generation of the post-recording noise and its relationship to the machining process, and provides a novel manufacturing method of a magnetic head which prevents the post-recording noise.

DISCLOSURE OF THE INVENTION

The manufacturing method of a magnetic head as recited in claim 1 is a manufacturing method including at least a recording and reproducing head comprises the steps of preparing a fused core block using a Mn-Zn ferrite having an mean crystal grain size of equal to or less than 30 $\mu$m as a core material of said recording and reproducing head and by glass fusion using one kind of glass; cooling said fused core block; maintaining said fused core block at a temperature equal to or higher than a strain point of said glass (a temperature at which the viscosity of the glass is $10^{14.5}$ pois), and cooling and annealing.

The manufacturing method of a magnetic head as recited in claim 2 is the manufacturing method as claimed in claim 1, wherein the head core chip formed by slicing said fused core block is annealed.

The manufacturing method of a magnetic head as recited in claim 3 is a manufacturing method of a magnetic head including at least a recording and reproducing head comprising the steps of preparing a fused core block using a Mn-Zn ferrite having an mean crystal grain size of equal to or less than 30 $\mu$m as a core material of said recording and reproducing head and by glass fusion using one kind of glass; cooling said fused core block immediately after said preparation of the fused core block to a temperature lower than a softening point of said glass (a temperature at which the viscosity of the glass is $10^{7.5}$ pois) and removing a fusion load therefrom and maintaining; and cooling and annealing.

The manufacturing method of a magnetic head as recited in claim 4 is the manufacturing method as claimed in any one of claims 1–3, wherein the magnetic head comprises a composite magnetic head including an erasing head.

The manufacturing method of a magnetic head as recited in claim 5 is a manufacturing method including at least a recording and reproducing head comprises the steps of preparing respective fused core blocks using a Mn-Zn ferrite having an mean crystal grain size of equal to or less than 30 $\mu$m as a core material of said recording and reproducing head and the erasing head and by glass fusion using one kind of glass; cooling said fused core block; maintaining, for at least the recording and reproducing head, said fused core block at a temperature equal to or higher than the strain point of the glass, and cooling and annealing; and thereafter, the respective fused core blocks are made unitary through the use of a glass having an operation point lower than that of said glass.

The manufacturing method of a magnetic head as claimed in claim 6 is a manufacturing method of a magnetic head including a recording and reproducing head as well as an erasing head, comprises the steps of preparing respective fused core blocks using a Mn-Zn ferrite having an mean crystal grain size of equal to or less than 30 μm as a core material of said recording and reproducing head and the erasing head and by glass fusion using one kind of glass; cooling said fused core block immediately after said preparation of the fused core block to a temperature lower than a softening point of said glass (a temperature at which the viscosity of the glass is $10^{7.5}$ pois) and equal to or higher than the strain point (a temperature at which the viscosity of the glass is $10^{14.5}$ pois) and removing a fusion load therefrom and maintaining; and cooling and annealing; and thereafter, the respective fused core blocks are made unitary through the use of a glass having an operation point lower than that of said glass.

The manufacturing method of a magnetic head as claimed in claim 7 is the manufacturing method of a magnetic head as claimed in claims 1, 3, 5 or 6, wherein the cooling from the maintaining temperature to the strain point is carried out at a cooling speed of equal to or less than 50° C./hour.

In the manufacturing method of magnetic head as claimed in claims 1 to 7, Mn-Zn ferrite having an mean crystal grain size of equal to or less than 30 μm is used for at least the recording and reproducing head, so that moving distance of the magnetic domain wall defining the magnetic section is made small. Also, the fused core block is maintained at a maintaining temperature equal to or higher than the glass strain point and thereafter cooled and annealed, so that the internal strain of the core material generated during the fused core block forming by the fusion load due to the difference in the coefficients of the thermal expansion between the glass and the core material can be eliminated together with the residual stress, so that the post-recording noise can be reduced or eliminated.

In the manufacturing method of the magnetic head as claimed in claims 3 and 6, after the formation of the fused core block, the fused core block is immediately annealed, so that the formation and the annealing of the fused core block may be achieved in the same process, allowing the manufacturing steps to be decreased.

In the manufacturing method of the magnetic head as claimed in claim 7, the post-recording noise can be reduced or eliminated and, by cooling from the maintaining temperature to the strain point is carried out at a cooling speed of equal to or less than 50° C./hour, the generation of glass cracks can be decreased.

BRIEF DESCRIPTION OF THE DRAWINGS

FIG. 5 is a perspective view illustrating a manufacturing step common the manufacturing method of the magnetic head of the conventional technique and the present invention;

FIGS. 6(A) and 6(B) are perspective views explaining manufacturing steps common to the manufacturing method of the magnetic head according to the conventional technique and the present invention;

FIGS. 7(A), 7(B) and 7(C) are perspective views explaining a manufacturing step common to the manufacturing method of the magnetic head according to the conventional technique and the present invention;

FIGS. 8(A) an 8(B) are perspective view explaining a manufacturing step common to the manufacturing method of the magnetic head according to the conventional technique and the present invention;

FIGS. 9(A) and 9(B) are perspective view explaining a manufacturing step common to the manufacturing method of the magnetic head of the conventional technique and the present invention;

FIG. 10 is a perspective view illustrating the glass fusion jig;

FIGS. 14(A) and 14(B) are graphs showing a measured example by the pre-amplifier outputs and the differentials outputs in which the post-recording noises are overlapped when the recording and reproducing were repeated 54,000 times as to the magnetic head with the post-recording noise and the magnetic head without the post-recording noise;

FIGS. 21(A–D) recite exemplary manufacturing methods according to the present invention in flowchart form. For instance, FIG. 21(A) illustrates a manufacturing method for producing magnetic head components having reduced post-recording noise including at least a recording and reproducing head, comprising the steps of: preparing a fused core block using a Mn-Zn ferrite having a mean crystal grain size of equal to or less than 30 μm as a core material of the recording and reproducing head and for using one kind of glass for a glass fusion (step S1); cooling the fused core block (step S2); maintaining the fused core block at a temperature equal to or higher than a strain point of the glass (step S3); and cooling and annealing the fused core block (step S4).

FIG. 21(B) illustrates another manufacturing method of magnetic head components for reducing post-recording noise including at least a recording and reproducing head comprising the steps of: preparing a fused core block using a Mn-Zn ferrite having a mean crystal grain size of equal to or less than 30 μm as a core material of the recording and reproducing head and using one kind of glass for a glass fusion (step S5); cooling the fused core block immediately after the preparation of the fused core block to a temperature lower than a softening point of the glass (step S6); removing a previously applied fusion load from the fused core block and maintaining the above-referenced temperature (step S7); and cooling and annealing the fused core block (step S8).

FIG. 21(C) illustrates another manufacturing method for producing magnetic head components with reduced post-recording noise including at least a recording and reproducing head and an erasing head, comprising the steps of: preparing respective fused core blocks using a Mn-Zn ferrite having a mean crystal grain size of equal to or less than 30 μm as a core material of the recording and reproducing head and the erasing head and using one kind of fusion glass for a glass fusion (step S9); cooling the fused core block (step S10); maintaining, for at least the recording and reproducing head, the fused core block at a temperature equal to or higher than a strain point of the glass (step S11); cooling and annealing the fused core block (step S12); and combining respective fused core blocks through the use of a glass having a working temperature lower than that of the fusion glass (step S13).

FIG. 21(D) illustrates yet another manufacturing method of magnetic head components having reduced post-recording noise including a recording and reproducing head as well as an erasing head, comprising the steps of: preparing respective fused core blocks using a Mn-Zn ferrite having a mean crystal grain size of equal to or less than 30 μm as a core material of the recording and reproducing head and the erasing head and using one kind of fusion glass for a glass fusion (step S14); cooling the fused core block immediately after the preparation of the fused core block to a temperature lower than a softening point of the glass and equal to or higher than a strain point of the glass (step S15); removing a previously applied fusion load from the core block and maintaining the temperature (step S16); cooling and annealing the core block (step S17); and combining respective fused core blocks through the use of a glass having a working temperature lower than that of the fusion glass (step S18).

THE BEST MODE FOR CARRYING OUT THE INVENTION

For the core material of the magnetic head for the FDD and the hard disc unit, a high magnetic permeability ferrite having the saturation magnetostriction and the crystalline anisotropic constant are both close to zero.

Figure 3:
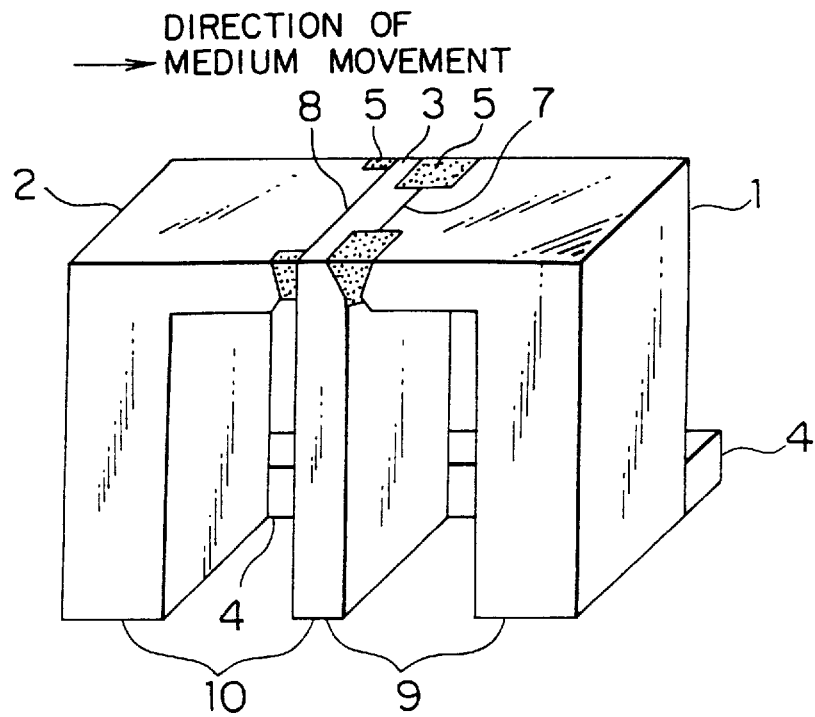
FIG. 3 is a perspective view illustrating the forward erase type composite magnetic head having the structure of the unitary I core that can be manufactured by the manufacturing method of the present invention.

In connection with the composite magnetic head of the structure shown in FIG. 3, the manufacturing method for the composite magnetic head for suppressing the post-recording noise was studied and the cause of the generation of the post-recording noise was tested and studied through the use of, as the core material for the FDD magnetic head having the above magnetic properties, as shown in Table 1, a ferrite having a composition of 48, 12 and 11 weight % of Fe, Mn and Zn, respectively, and the balance being oxygen and having an mean crystal grain size of 69, 52, 30 and 15 μm as well as a ferrite having a composition of 48, 14 and 9 weight % of Fe, Mn and Zn, respectively, and the balance being oxygen and having an mean crystal grain size of 39 and 14 μm, and three kinds of lead glass shown in Table 2 were used as the fusion glass and the mold glass.

TABLE 1

Composition, Saturation Magnetic Flux Density and Crystal Grain Size of Mn-Zn Ferrite

| Item Type | Fe Content (%) | Mn Content (%) | Zn Content (%) | Saturation Flux Density (G) | Mean Crystal Grain Size (μ) |
|---|---|---|---|---|---|
| A | 48 | 12 | 11 | 4500 | 69 |
| B | ditto | ditto | ditto | ditto | 52 |
| a | ditto | ditto | ditto | ditto | 30 |
| b | ditto | ditto | ditto | ditto | 15 |
| c | 48 | 14 | 9 | 5100 | 30 |
| d | ditto | ditto | ditto | ditto | 14 |

Note 1:
Fe, Mn, Zn contents weight % (decimal part expressed with counting fractions over ½ as one and disregarding the rest), the balance being oxygen
Note 2:
the crystal grain size is measured at the longest side of each crystal and their mean value is taken

TABLE 2

Fusion Glass and Mold Glass Properties

| Item Type | Strain Point °C. | Transition Point °C. | Softening Point °C. | Working Point °C. | Thermal Expansion Coefficient/°C. |
|---|---|---|---|---|---|
| I | 410 | 420 | 455 | 750 | 95 |
| II | 390 | 400 | 435 | 740 | 110 |
| III | 310 | 315 | 365 | 435 | 110 |

Embodiment 1.

Figure 14A:
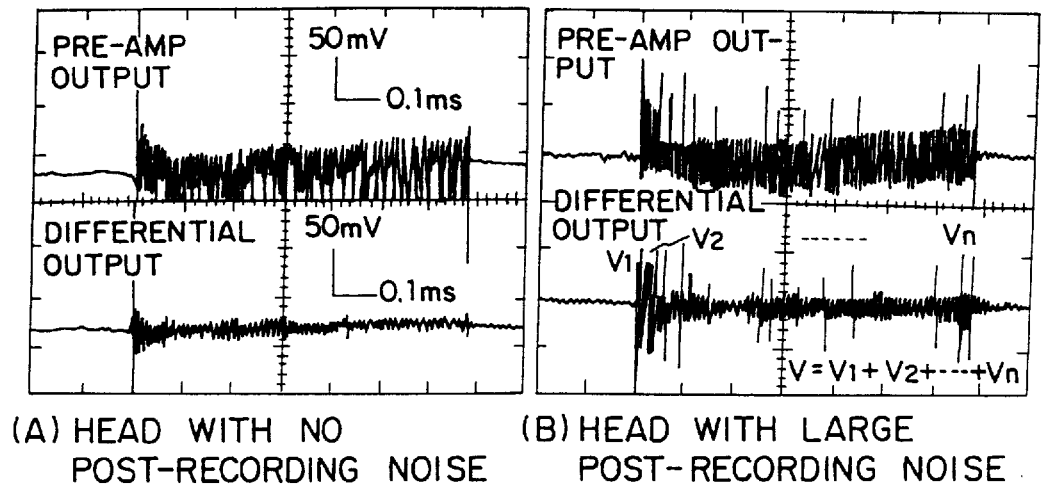

As the core material for the recording and reproducing head, a Mn-Zn ferrite shown in Table 1 as Type a (the mean crystallin grain size 30 μm) was used, as the glass of Type I was used as the fused glass to manufacture the fused core block, which fused core block was held at 480° C. within the nitrogen atmosphere for 8 hours and cooled to be annealed at a cooling speed of 50° C./hour, whereby the magnetic head with the annealing and without the annealing are manufactured. FIGS. 14(A) and 14(B) are observations at the FDD pre-amplifier output and the differential output of the reproducing signal with 54,000 times recording and reproducing, from the magnetic head with and without the anneal process. As seen from FIG. 14(B), the post-recording noise are frequently observed in the non-annealed magnetic head, whereas as seen FIG. 14(A) no post-recording noise is observed in the annealed magnetic head. In the figures, the reason that the pre-amplifier output and the differential output are belt-shaped having a certain width is that is the thermal noise due to the amplifier and the resistance of the head coil and are not the post-recording noise.

As apparent from FIGS. 14(A) and 14(B), a magnetic head that does not generate the post-recording noise can be manufactured by selecting the average crystal grain size of the core material to be 30 μm, maintaining it at a temperature equal to or higher than the softening point (which is also above the strain point) of the glass used in the glass fusion, annealing to the strain point at a speed of 50° C./hour. Also, by making the cooling speed from the maintaining temperature to the strain point 50° C./hour, the cracks in the glass can be prevented.

Embodiment 2.

A fused core block is manufactured by using the Mn-Zn ferrite of types A and B of Table 1 (average crystal grain size is more than 30 μm), a, b, c and d (average crystal grain size is equal to or less than 30 μm) as the core material for the recording and reproducing head, and the glass of type I as the fusion glass for A, B, a and b, and the glass of type II as the fusion glass for c and d, the fused core block is sliced to form magnetic heads, 500 of which are annealed and the others are not annealed, and the unsatisfactory product percentage because of the post-recording noise is examined.

Figure 15:
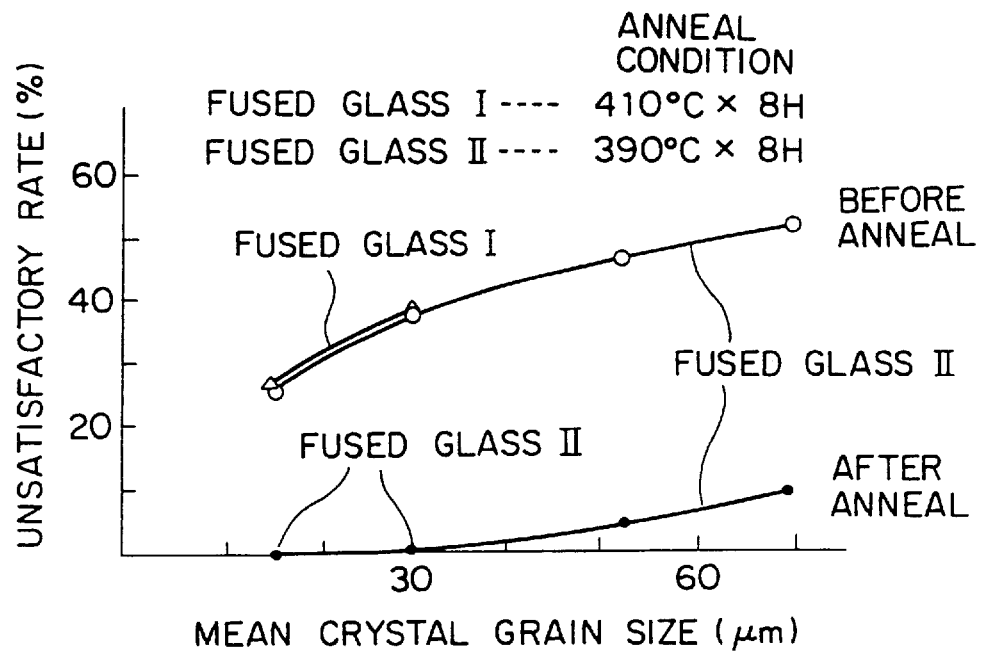
FIG. 15 is a view showing the relationship between the unsatisfactory product percentage and the mean crystal grain size before and after annealing.

As shown in FIG. 15, the general tendency was that the unsatisfactory product percentage of that without annealing was significantly higher than that with annealing and, moreover, the greater the average crystal grain size, the higher the unsatisfactory product percentage. While the magnetic head using A and B of a large average crystal grain size generated defect even after the annealing, the magnetic head using a, b, c and d of small average crystal grain size did not generates defect at all.

Next, the results of study of the cause of the generation of the post-recording noise will be discussed.

The magnetic head in above embodiments 1 and 2 have the gap length and the center gap depth are 0.5 $\mu$m and 50 $\mu$m, respectively. The gap length and the gap depth is related to the post-recording noise.

Figure 16:
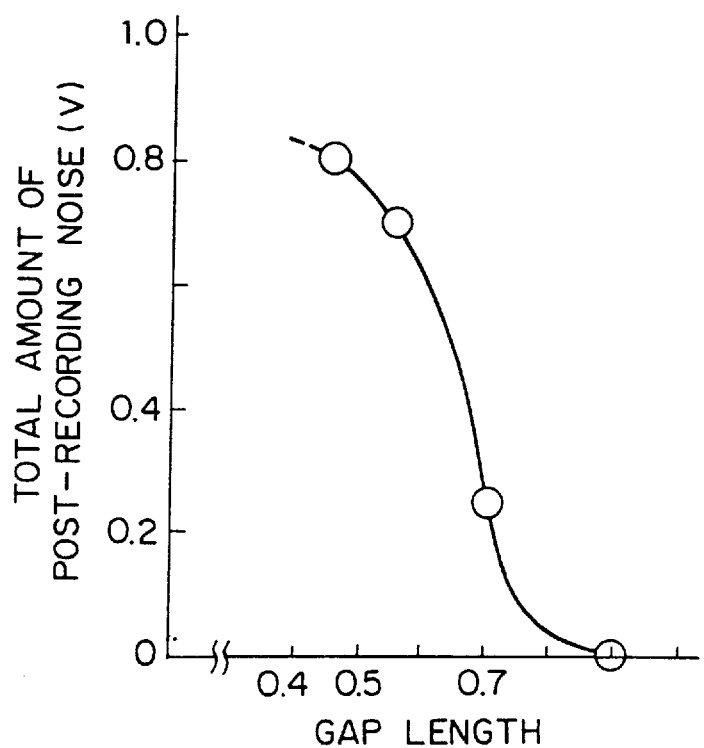
FIG. 16 is a view showing the relationship between the gap length and the post-recording noise.

As a result of studying the relationship of the gap length and the gap depth to the post-recording noise, as shown in FIG. 16, it is confirmed that the post-recording noise generates when the gap length is equal to or less than 0.9 $\mu$m.

Figure 17:
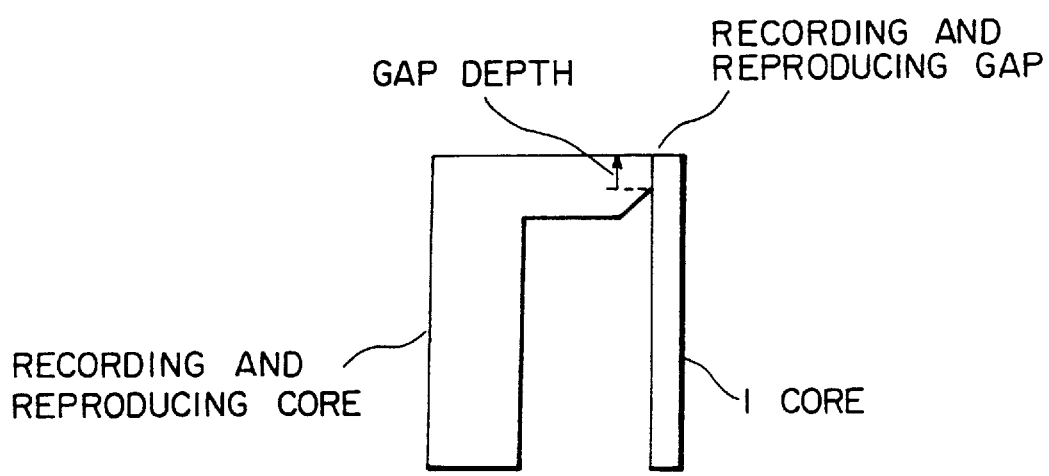
FIG. 17 is a view showing the gap depth.

The post-recording noise decreases with a larger gap length, which indicates that this functions to accelerate the movement of the magnetic domain wall. As is well known in electromagnetic, the self-reducing magnetic field of the magnetic circuit with a gap is distributed with its maximum valve at the gap surface, and the magnetic circuit of the magnetic head is constructed to have a small volume in the vicinity of the gap to concentrate the magnetic flux at the gap area, so that the generation source of the post-recording noise is located in the vicinity of the gap area in which the magnetic flux density is high and filled with glass. Also, the gap depth (see FIG. 17) relates to the generation of the post-recording noise, and as the gap depth becomes shallow (see FIG. 17), the noise level simply decrease, and it was experimentally confirmed that the noise level becomes zero with a gap depth of about several $\mu$m. This experimental results backs up the above hypothesis concerning the main generation source of the post-recording noise.

The generation of the post-recording noise is considered to be caused partly by the size of the magnetic domain or the moving distance of the magnetic domain as well as by the residual stress caused by the fusion load generated by the difference in thermal expansion coefficient between the core material (Mn-Zn ferrite) and the jig 23 shown in FIG. 10 during the glass fusion.

(1) On the relationship between the size of the magnetic domain and the post-recording noise Jpn. J. Appl. Phys., 1964, p. 576 as well as J. Phys. Soc. Japan, 1963, p. 684 disclose that the saturation magnetostriction and the crystal magnetic anisotropic constant are heavily dependent upon the composition. In Embodiment 1 and Embodiment 2, the generation of the post-recording noise is different in the materials which are the same in their composition and different only in mean crystal grain size, i.e., which are considered to have substantially the same saturation magnetostriction and the crystal magnetic anisotropic constant. Generally, it is known that the size of the magnetic domain of a magnetic material depends upon the crystal grain size, and that the smaller the crystal grain size, the finer the magnetic domain becomes. When an externally applied magnetic field dependent upon a recording current is removed, the magnetic domain wall is apt to move into the position at which the positional energy is smaller around that area, but it is considered that in a large magnetic domain, the moving distance of the magnetic domain wall is large and the probability of the magnetic wall hit at impurities, holes or potential hills due to residual stresses located inside to be subjected to pinning of the magnetic wall.

(2) The residual stress due to the fusion load

It is well known in magnetic physics that the residual stress impedes the movement of the magnetic domain wall and is discussed in detail in The Magnetic Handbook, Asakura Shoten, 1975, page 14, for example.

The residual stresses in the manufacture of the magnetic head can be classified into the following three categories i) to iii).

i) The stress within the elastic limit that resides in the magnetic head core material after the glass fusion due to the difference in thermal expansion coefficient of the Mn-Zn ferrite used as the core material and the glass used in glass fusion. Since the glass is very weak material because of its mechanical property, the thermal expansion coefficient of the glass is made slightly smaller than that of the core material so that a compression stress is applied to the glass, which accordingly generates a small tensile stress in the core material.

ii) During manufacturing of the head chips from the fused core block, the outermost surface layer of the head chip has formed therein a finished affected layer, such as a layer disclosed in Proceeding of the International Conference, September–October (1980), Japan, pp. 667–674 in which a compression stress corresponding to 1% of the elastic constant resides, so that a residual tension corresponding to this remains inside thereof, reducing the magnetic permeability of the head chip.

iii) In the glass fusion process, the thermal expansion coefficient of the fusion jig is selected to be smaller than the thermal expansion coefficient of the core material so that a compression force is applied to the gap defining surface due to the difference in thermal expansion between the fusion jig and the core material at the temperature of glass fusion, whereby a uniform gap length is realized in the longitudinal direction of the fused core block and of the order of submicrons. Since the flatness of the gap defining surface is not perfect, the compression force is made large so that the core material is sufficiently deformed during the fusion in order to obtain a uniform gap length.

In the fusion jig 23 illustrated in FIG. 10, in order to obtain a rough value of thermal stress, a thermal stress analysis using the limited element method was achieved with a combination of alumina having an elastic constant of $3.5 \times 10^4$ Kg/mm$^2$, Poisson's ratio of 0.25 and thermal expansion coefficient of $71 \times 10^{-7}$/°C. and an Mn-Zn ferrite having an elastic constant of $1.7 \times 10^4$ Kg/mm$^2$, Poisson's ratio of 0.33 and thermal expansion coefficient of $125 \times 10^{-7}$/°C. and with the working point of glass fusion of 650° C., with the results that a large compressive stress more than 10 kg/mm$^2$ is applied to the core material (Mn-Zn ferrite), and since this is a value close to the maximum bending stress 12 kg/mm$^2$ of the Mn-Zn ferrite, it is easily conceivable that a plastic deformation can take place.

Out of the above three types of stresses, i) cannot be moderated by annealing, so that it is apparent that this is not related to the post-recording noise. That is, while the stress due to the thermal expansion difference between the glass and the Mn-Zn ferrite is mostly moderated when it is being maintained at the anneal temperature above the glass softening point because of the softening of the glass, the glass is hardened while it is being cooled to the room temperature and a stress is generated due to the thermal expansion coefficient difference, so that it is impossible to eliminate the stress.

Then, the relationship between the stress of 2) above and the post-recording noise was studied.

Figure 18:
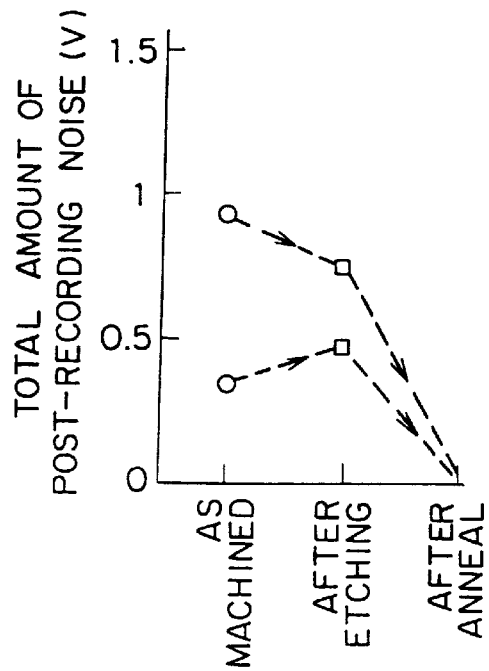
FIG. 18 is a view showing the relationship between the head chip machining, the etching and the annealing and the post-recording noise.

First, after a fused core block was manufactured using a Mn-Zn ferrite of Type a as the core material and a glass of Type II as the fusion glass, the fused core block was sliced by the cutting using a diamond wheel and then the lapping finishing was applied to the surface with diamonds of grain size 3 μm to provide thereon a strain layer. Then this was measured as to its post-recording noise. After this, the above strain layer on the surface was removed by etching with 50% phosphoric acid and was measured as to its post-recording noise. FIG. 18 illustrates the results of this, from which it is seen that the removal of the surface strain layer by etching did not give any affect on the post-recording noise, but is greatly reduced by annealing thereafter.

Further, GC (green carborundum) #4000 was used to lapping finish the Mn-Zn ferrite sheet to obtain a thickness of 0.3 mm which is equal to that of the magnetic head, and a ferrite ring having an outer diameter of 5 mm and an inner diameter of 3 mm was cut of from this sheet by means of a ultrasonic machining machine. One portion of this ferrite ring was etched with 50% phosphoric acid to remove a strain layer, and further one portion of the above ferrite ring was annealed in nitrogen under the conditions of the maintaining temperature of 480° C. and time of 8 hours and the maintaining temperature of 750° C. and time of 0.5 hours.

As for the measured initial magnetic permeabilities of the ferrite rings as lapping finished, as etched and as annealed at a frequency of 100 kHz, as shown in Table 3, the initial magnetic permeability of the ferrite ring as GC lapping finished was 2100, whereas when the ring was annealed at the working point or the glass fusion temperature, the initial magnetic permeability was recovered close to that of the ferrite ring as etched. Therefore, the finishing strain due to the lapping may be considered to be removed by the glass fusion step, so that this can be said not to be the cause of the post-recording noise.

TABLE 3

Finishing, Heat-treatment Conditions and Initial Permeability of Ferrite Ring

| Finishing Condition | GB Polished | Etched | Annealed 480° C. × 8 H | Annealed 750° C. × 0.5 H |
|---|---|---|---|---|
| Specific Initial Permeability | 2100 | 11800 | 11700 | 12200 |

Then, the above ferrite ring as etched was mounted to the fusion jig so that a load is applied to the ring surface, heat-treated at 750° C. and the initial magnetic permeability after the heat-treatment was measured at 100 kHz, then it was confirmed that the permeability was decreased to about 20% to 40% when etched but was recovered when annealed again with no load. This may be explained that the heat treatment under the load causes an internal strain including dislocations to resides in the Mn-Zn ferrite, and that the cause of the generation of the post-recording noise is the residual strain caused by the fusion load during the glass fusion.

Embodiment 3.

As discussed in connection with above embodiment 1, it was determined that the generation of the post-recording noise is caused by the residual stress generated in the core material due to the fusion load at the time of glass fusion and that the post-recording noise can be removed by using Mn-Zn ferrite having a mean crystal grain size of equal to or less than 30 μm as the core material and by annealing under un-loaded condition after the glass fusion. When there is an intervening fusion glass the anneal conditions which allows the residual stress generated in the core material due to the fusion load to be removed is related to the physical properties of the fusion glass.

This embodiment is the one that made this fact clear.

As the core material for the recording and reproducing head, a Mn-Zn ferrite shown in Table 1 as Types a, b, c and d (the mean crystal grain size equal to or less than 30 μ) was used, as the glass of Types I and II were used as the fused glass, respectively, to manufacture the fused core blocks, which fused core blocks were annealed within the nitrogen atmosphere while changing the maintaining temperature and maintaining time to manufacture the magnetic head, and the generation of the post-recording noise was examined.

Figure 19:
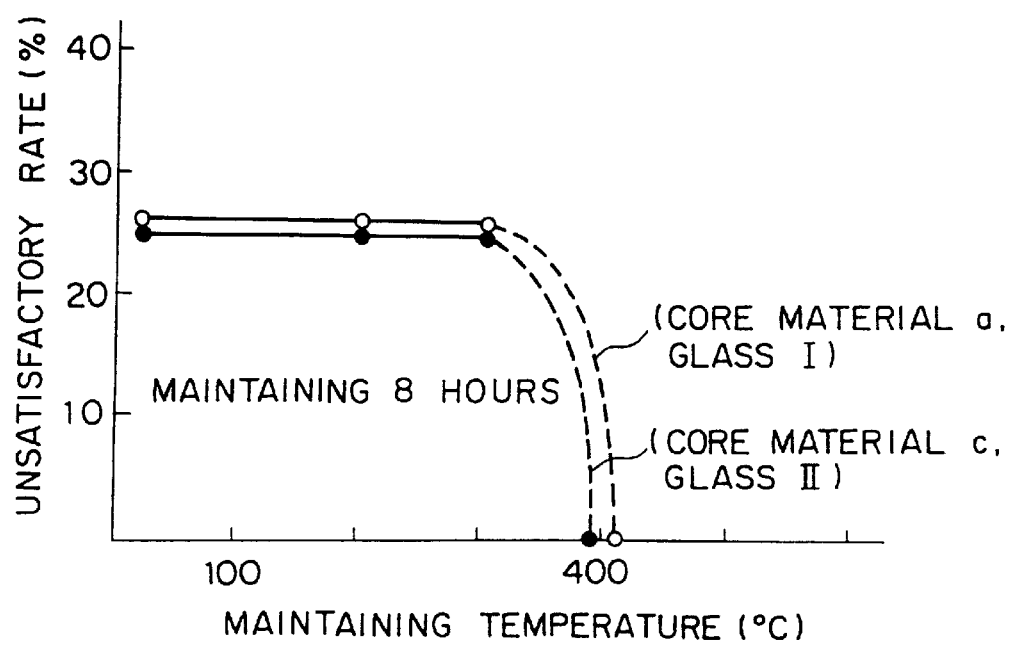
FIG. 19 is a view showing the relationship between the post-recording noise and the anneal maintaining time.

FIG. 19 illustrates the results of the measurement of the effect of the maintaining temperature with respect to the unsatisfactory percentage due to the generation of the post-recording noise. As apparent from the figure, when the glass of Type I was used, the unsatisfactory percentage did not decrease at a maintaining temperature lower than the strain point of 410° C., whereas the unsatisfactory percentage is zero at the strain point of 410° C. Also, even when the glass of Type II was used, the unsatisfactory percentage was also zero at the maintaining temperature of the strain point 390° C.

Figure 20:
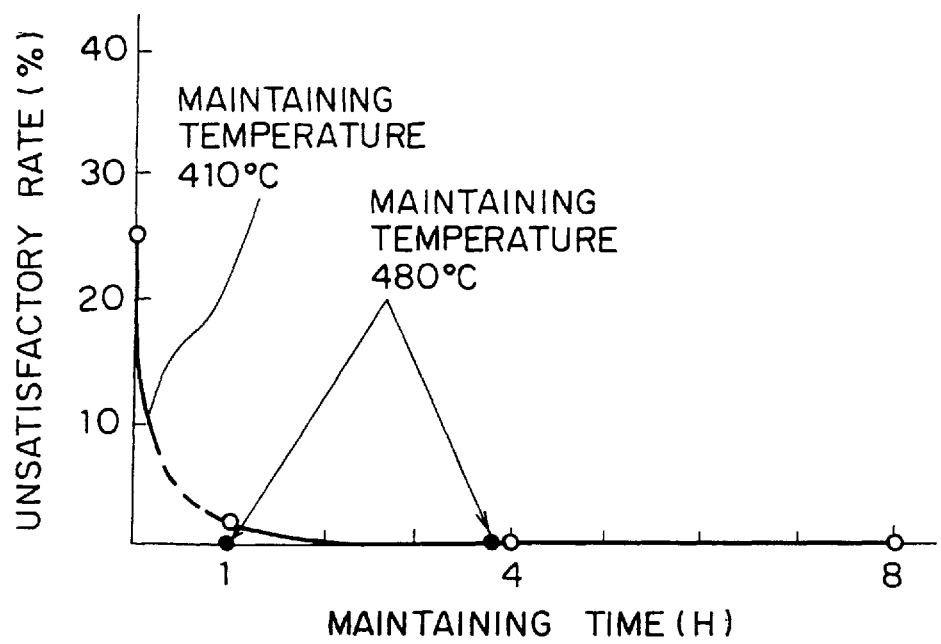
FIG. 20 is a view showing the relationship between the post-recording noise and the anneal maintaining temperature.

Further, FIG. 20 illustrates the results of the effects of the maintaining time on the unsatisfactory percentage due to the generation of the post-recording noise. As apparent from the figures, when annealed at a maintaining temperature above the softening point of the fused glass (Type 1 was used), the unsatisfactory percentage becomes zero at a time interval shorter than that in the case where the maintaining temperature is set at the strain point temperature. That is, since the glass viscosity decreases as the maintaining temperature increases from the strain point, the transition point, the softening point and a higher than the softening point, it is considered that the higher the maintaining temperature, the shorter the time required for the annealing effect obtained.

Embodiment 4.

In Embodiments 1, 2 and 3, the fused core block was first manufactured and then the cooled fused core block is heated again to a temperature at the strain point or above the strain point to anneal it, which includes two steps.

In this embodiment, after the glass fusion in the process of manufacturing the fused core block, continuously with the glass fusion, the temperature is lowered from the glass fusion temperature (working point) to the strain point or a temperature above the strain point, at which temperature the block was maintained and annealed.

By annealing as a continuation of the glass fusion as described above, the post-recording noise can be eliminated by a single step similarly to Embodiments 1, 2 and 3.

Embodiment 5.

While, in Embodiments 1, 2 and 3, the fused core block was annealed, similar advantageous effects can be obtained when the fused block is sliced to obtain head chips, and these sliced head chips are annealed as in Embodiments 1, 2 and 3.

Figure 1:
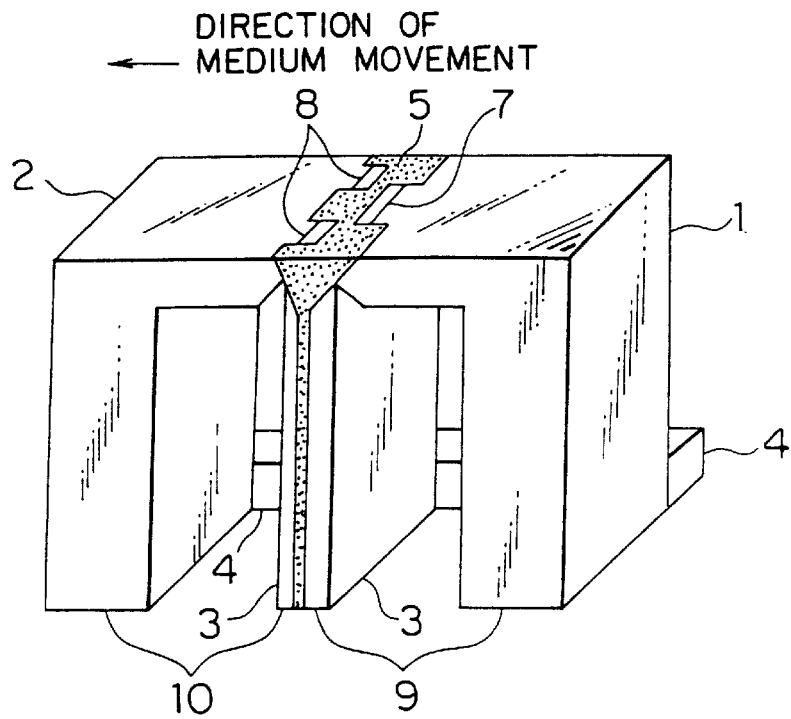
FIG. 1 is a perspective view of the tunnel erase type composite magnetic head that can be manufactured by the manufacturing method of the present invention.
Figure 2:
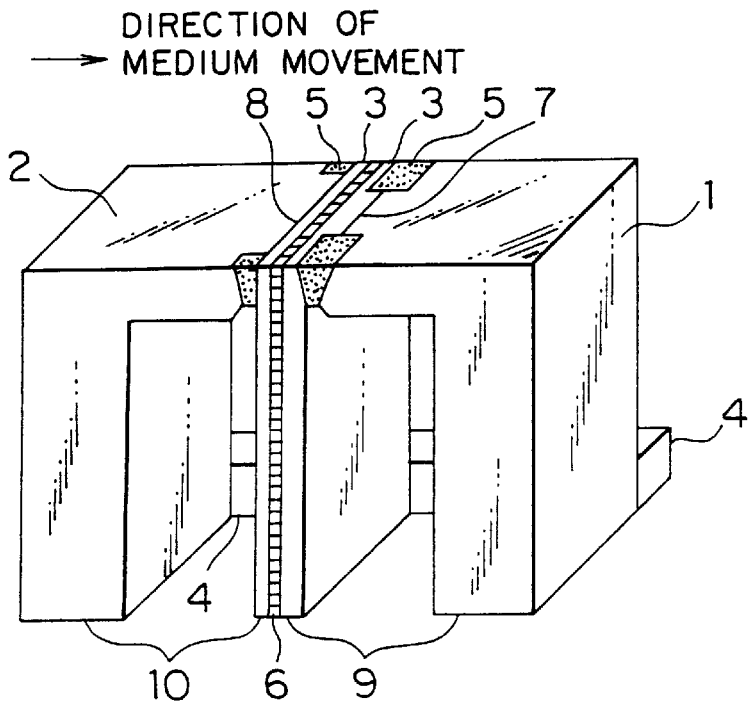
FIG. 2 is a perspective view of the forward erase type composite magnetic head that can be manufactured by the manufacturing method of the present invention.
Figure 4:
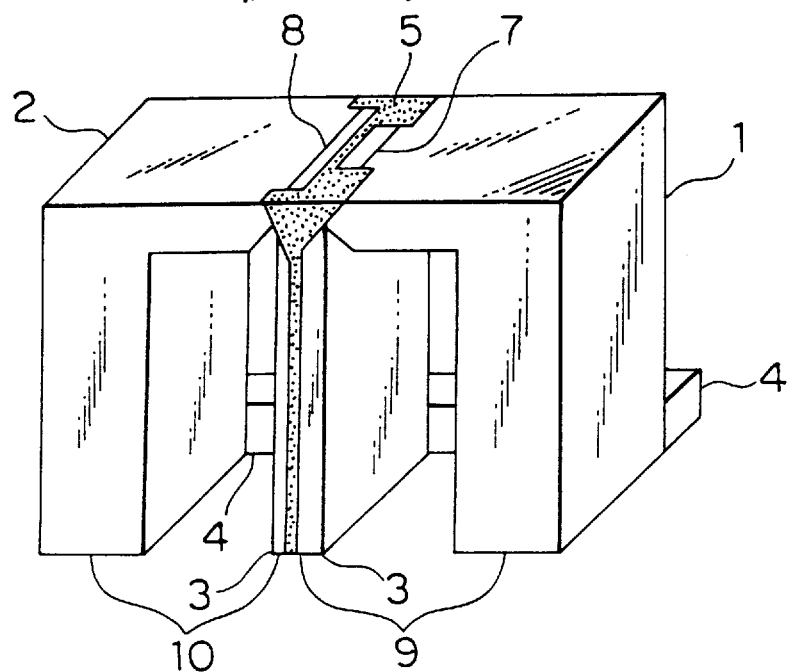
FIG. 4 is a perspective view of the forward erase type composite magnetic head of the structure of the separate I core that can be manufactured by the manufacturing method of the present invention.
Figure 11:
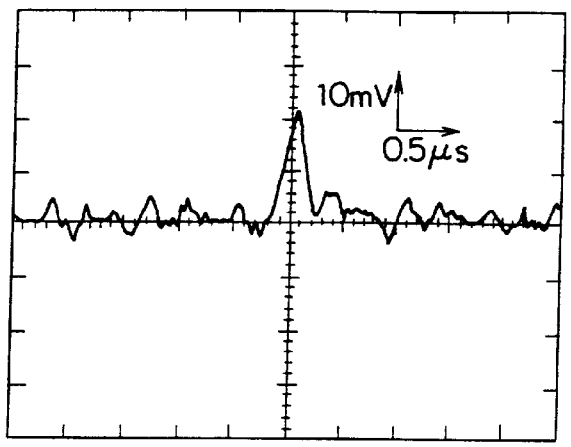
FIG. 11 is a view showing a measured example of the single waveform of the post-recording noise.
Figure 12:
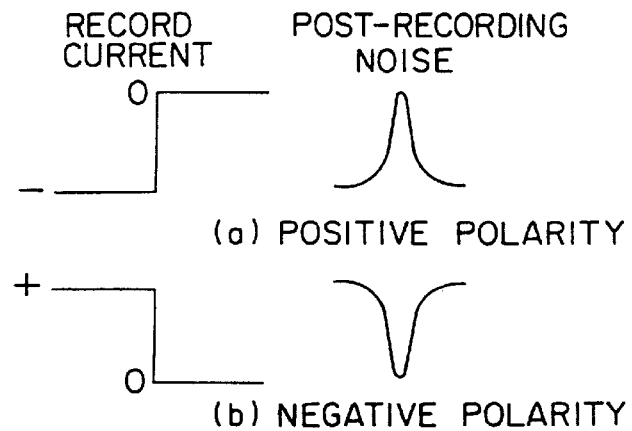
FIG. 12 is a view qualitatively explaining the relationship between the recording current and the post-recording noise.
Figure 13:
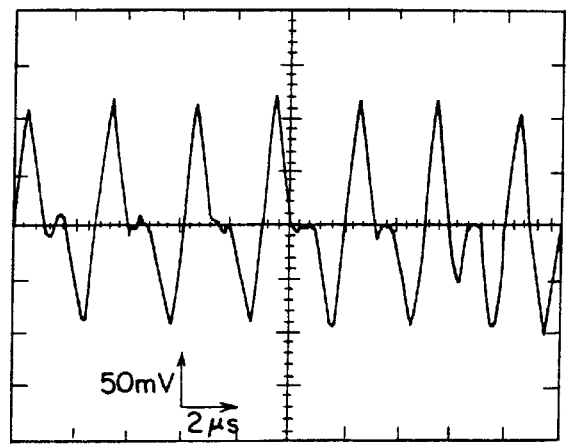
FIG. 13 is a view showing a measured example of the reproducing waveform in which the post-recording noises are overlapped.

Also, while the manufacturing methods of the above Embodiments 1–5 are described in conjunction with an example of the forward erasing type composite magnetic head in which the recording and reproducing core 1 and the erasing core 2 are disposed at both sides of the center core 3 shown in FIG. 3, similar advantageous results of removing the post-recording noise can also be obtained when applied to a forward erasing type composite magnetic head shown in FIG. 4 having a spacer at the central portion of the center core 3 and the recording and reproducing core and the erasing core are magnetically separated, a tunnel erasing type composite magnetic head shown in FIG. 1 in which the erasing core 2 is disposed at the rear of the recording and reproducing core 1 with respect to the advance direction of the medium and a magnetic head having no erasing core 2. Embodiments 6.

The above Embodiments 1–5 utilize only one type of glass for the fusion glass.

When a glass of a higher working point (Table 2, Type I or II) is used as the fusion glass and a lower working point (Table 2, Type III) is used as the mold glass, the anneal maintaining temperature is disadvantageously limited by the glass of the lower working point. When the anneal temperature is increased for the higher anneal effect, the glass viscosity decreases to allow the flow of the glass, which causes the change of the distance between the recording and reproducing gap and the erasing gap and the shift of the relative position of the recording and reproducing core and the erasing core. For example, when the glass of Type I is used for the gap formation by the glass fusion and the glass of Type III is used for the mold glass. The working temperature of the glass of Type III is 435° C. and the effective lower limit temperature for the anneal for the glass fusion (gap formation) with the glass of Type I used is 410° C., so that the anneal maintaining temperature is close to the working temperature of the glass of Type III, allowing the glass to flow and causing the above problem.

Therefore, when a glass of a higher working temperature is used as the gap defining glass and a glass of a working temperature lower than that of the gap defining glass is used as the mold glass, after the glass fusion for defining the gap, the post-recording noise can be eliminated by annealing at a temperature above the stain point of the glass for defining the gap and thereafter filling the mold glass under unloaded conditions.

While the magnetic heads manufactured in Embodiments 1–6 have gap length and the central gap depth are 0.5 μm and 50 μm, respectively, which are within the region in which the post-recording noise generates, the post-recording noise can be eliminated by selecting the core material to have the mean crystal grain size of 30 μm, and by annealing at the strain temperature or a temperature higher than the strain point.

In the manufacturing method of composite magnetic head as claimed in claims 1–7, since a Mn-Zn ferrite having a mean crystal grain size of equal to or less than 30 μm is used at least as the recording and reproducing head, the moving distance of the magnetic wall defining the magnetic domain is shortened, and since the anneal is achieved after maintaining at a maintaining temperature equal to or higher than the glass train point and cooling, the internal strain in the Mn-Zn ferrite generated by the fusion load due to the thermal expansion coefficient difference between the glass and the Mn-Zn ferrite while manufacturing the fused core block can be removed to eliminate the residual stress, thereby to eliminate the post-recording noise.

In the manufacturing method of the composite magnetic head as claimed in claims 3 and 6, since the anneal is achieved in continuity with the formation of the fused core block after the fused core block is manufactured, the formation of the fused core block and the annealing can be achieved in the same single step, causing the number of manufacturing steps to decrease.

In the manufacturing method of the composite magnetic head as claimed in claim 7, the post-recording noise can be reduced or eliminated and the generation of the cracks in the glass can be suppressed by carrying out the cooling from the maintaining temperature to the strain point at a cooling speed of 50° C./hour or less.

We claim:

1. A manufacturing method for producing magnetic head components having reduced post-recording noise including at least a recording and reproducing head, comprising the steps of:

preparing a fused core block using a Mn-Zn ferrite having a mean crystal grain size of equal to or less than 30 μm as a core material of said recording and reproducing head and using one kind of glass for a glass fusion;

cooling said fused core block;

after said cooling step, maintaining said fused core block for a prescribed amount of time at a temperature equal to or higher than a strain point of said glass; and after said maintaining step, cooling and annealing said fused core block.

2. A manufacturing method as claimed in claim 1, further including a step of forming a plurality of head core chips by slicing said fused core block.

3. A manufacturing method as claimed in claim 2, wherein the magnetic head components form a composite magnetic head including an erasing head.

4. A manufacturing method as claimed in claim 1, wherein the magnetic head components form a composite magnetic head including an erasing head.

5. A manufacturing method of magnetic head components as claimed in claim 1, wherein the cooling from the maintaining temperature from said step of maintaining to the strain point is carried out at a cooling rate of equal to or less than 50° C./hour.

6. A manufacturing method as claimed in claim 1, wherein said strain point of said glass corresponds to a temperature at which the viscosity of glass is $10^{14.5}$ pois.

7. A manufacturing method of magnetic head components for reducing post-recording noise including at least a recording and reproducing head comprising the steps of:

preparing a fused core block using a Mn-Zn ferrite having a mean crystal grain size of equal to or less than 30 μm as a core material of said recording and reproducing head and using one kind of glass for a glass fusion, wherein said preparing step includes applying a fusion load to said fused core block;

cooling said fused core block immediately after said preparation of the fused core block to a temperature lower than a softening point of said glass;

after said step of cooling, removing said previously applied fusion load from said fused core block and maintaining said temperature for a prescribed amount of time; and after said step of removing, cooling and annealing said fused core block.

8. A manufacturing method as claimed in claim 7, wherein said softening point of said glass corresponds to a temperature at which a viscosity of the glass is $10^{7.5}$ pois.

9. A manufacturing method as claimed in claim 7, wherein the magnetic head components form a composite magnetic head including an erasing head.

10. A manufacturing method of magnetic head components as claimed in claim 7, wherein the cooling from the maintaining temperature from said step of maintaining is carried out at a cooling rate of equal to or less than 50° C./hour.

11. A manufacturing method for producing magnetic head components with reduced post-recording noise including at least a recording and reproducing head and an erasing head, comprising the steps of:

preparing respective fused core blocks using a Mn-Zn ferrite having a mean crystal grain size of equal to or less than 30 μm as a core material of said recording and reproducing head and the erasing head and using one kind of fusion glass for a glass fusion;

cooling said respective fused core blocks;

after said step of cooling, maintaining, for at least the recording and reproducing head, said respective fused core blocks for a prescribed amount of time at a temperature equal to or higher than a strain point of the glass;

after said step of maintaining, cooling and annealing said respective fused core blocks; and after said step of cooling and annealing, combining said respective fused core blocks through the use of a glass having a working temperature lower than that of said fusion glass.

12. A manufacturing method of magnetic head components as claimed in claim 11, wherein the cooling from the maintaining temperature from said step of maintaining to the strain point is carried out at a cooling rate of equal to or less than 50° C./hour.

13. A manufacturing method of magnetic head components having reduced post-recording noise including a recording and reproducing head as well as an erasing head, comprising the steps of:

preparing respective fused core blocks using a Mn-Zn ferrite having a mean crystal grain size of equal to or less than 30 μm as a core material of said recording and reproducing head and the erasing head and using one kind of fusion glass for a glass fusion, wherein said preparing step includes applying a fusion load to said fused core blocks;

cooling said respective fused core blocks immediately after said preparation of the fused core block to a temperature lower than a softening point of said glass and equal to or higher than a strain point of said glass;

after said step of cooling, removing said previously applied fusion load from said respective core blocks and maintaining said temperature for a prescribed amount of time;

after said step of removing, cooling and annealing said respective core blocks; and after said step of cooling and annealing, combining said respective fused core blocks through the use of a glass having a working temperature lower than that of said fusion glass.

14. A manufacturing method as claimed in claim 13, wherein said softening point corresponds to a temperature at which the viscosity of the glass is $10^{7.5}$ pois, and said strain point corresponds to a temperature at which the viscosity of the glass is $10^{14.5}$ pois.

15. A manufacturing method of magnetic head components as claimed in claim 13, wherein the cooling from the maintaining temperature from said step of maintaining to the strain point is carried out at a cooling rate of equal to or less than 50° C./hour.

* * * * *

UNITED STATES PATENT AND TRADEMARK OFFICE
CERTIFICATE OF CORRECTION

PATENT NO. : 5,806,172
DATED : Sept. 15, 1998
INVENTOR(S) : Okada et al.

It is certified that error appears in the above-identified patent and that said Letters Patent is hereby corrected as shown below:

Title page, under item [63], Continuation Data, add --which is a 371 of PCT/JP95/00176 02/08/95 after Nov. 7, 1995 --.

Column 1, line 5, after now abandoned. add -- which is a 371 of PCT/JP95/00176.--.

UNITED STATES PATENT AND TRADEMARK OFFICE
CERTIFICATE OF CORRECTION

PATENT NO. : 5,806,172
DATED : Sept. 15, 1998
INVENTOR(S) : OKADA, et al.

It is certified that error appears in the above-identified patent and that said Letters Patent is hereby corrected as shown below:

On the title page, item    [22] is corrected to read:

PCT Filed: February 8, 1995 item    [86] is to be added as follows:

--[86] PCT No:    PCT/JP95/00176

§371 Date: November 7, 1995

§102(e) Date: November 7, 1995

Signed and Sealed this

Twenty-seventh Day of July, 1999

Attest:

Q. TODD DICKINSON

*Attesting Officer*      *Acting Commissioner of Patents and Trademarks*